June 28, 1960
L. W. PARKER
2,943,256
REGULATED HIGH VOLTAGE POWER SUPPLY
Filed Nov. 28, 1956
2 Sheets-Sheet 1
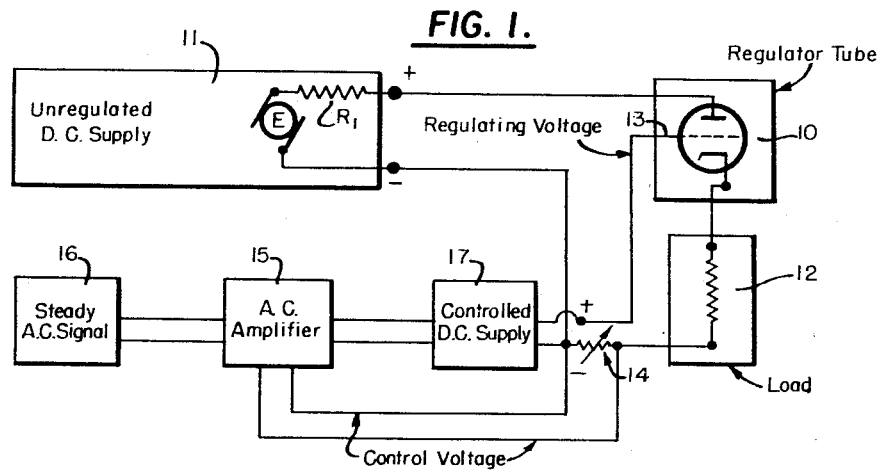
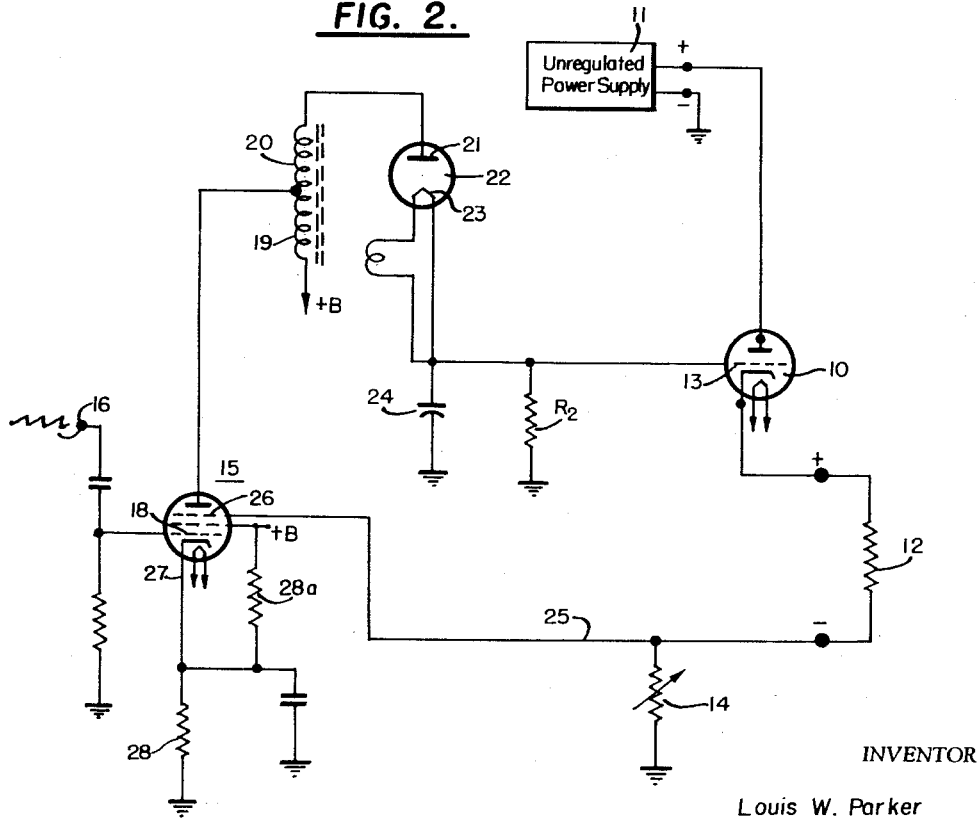
INVENTOR
Louis W. Parker
BY
ATTORNEYS June 28, 1960

L. W. PARKER 2,943,256

REGULATED HIGH VOLTAGE POWER SUPPLY

Filed Nov. 28, 1956

INVENTOR
Louis W. Parker

BY Moore & Hall

ATTORNEYS

United States Patent Office 2,943,256
Patented June 28, 1960

2,943,256

REGULATED HIGH VOLTAGE POWER SUPPLY

Louis W. Parker, 28 Polo Road, Great Neck, N.Y.

Filed Nov. 28, 1956, Ser. No. 624,847

13 Claims. (Cl. 321—16)

The present invention relates to regulated power supplies and is more particularly concerned with systems providing for high voltage power supplies having substantially perfect voltage regulation over a wide range of possible load current variation, the said system being simpler and cheaper to construct than regulated power supplies known heretofore; and in this respect, the present invention comprises a continuation-in-part of my prior copending application Serial No. 479,887, filed January 5, 1955, for: "Voltage Regulated Power Supply," now U.S. Patent No. 2,787,753, issued April 2, 1957.

At the present time, potential sources adapted to have extremely constant voltage outputs are required in many applications, particularly in the atomic radiation field. Regulated power supplies known at the present time monitor the output voltage produced, amplify any detectable changes in said output voltage, and thereafter employ this amplified increment to reduce these changes. It is quite obvious that some change in load voltage is inherently necessary in such prior systems to achieve compensation; and accordingly, such prior systems do not permit 100% voltage regulation. Prior voltage regulated power supplies known at the present time have been subject to further disadvantages; and in particular, have been complex in configuration and costly to manufacture.

In seeking to obviate certain of the foregoing disadvantages, I have described in my prior Patent No. 2,679,550 an improved form of voltage regulated power supply comprising an arrangement utilizing a grid-controlled regulator tube wherein the load is coupled to the cathode of the said tube so that it functions as a cathode follower. As described in said patent, the anode of the aforementioned regulator tube may be energized by a first source of direct voltage which is unregulated in nature, and the grid of the said regulator tube may be supplied by a source of regulated direct voltage separate and distinct from that coupled to the anode. By utilizing these distinct direct voltage sources, one of which is applied to the anode and the other to the grid of a cathode follower type regulator tube, it was found that the power taken by the load is drawn almost entirely from the unregulated anode source, whereby variations in load impedance have substantially no effect on the grid voltage supply; and as a result, the grid voltage of my basic high voltage power supply remains substantially unchanged by variations in load whereby changes in load voltage itself are reduced to a very low magnitude.

Certain of these principles are in fact employed in the present invention to be described subsequently; and accordingly, my prior Patent No. 2,679,550 is incorporated herein by reference, in order that certain of these basic principles need not be repeated. While the voltage regulation achieved by the system of my prior Patent No. 2,679,550 was found to be quite sufficient for most aplications, it was also found that substantially perfect regulation could be achieved by an improved form of that basic circuit, such as has been described in my aforementioned prior copending application Serial No. 479,887. The particular improvement of said copending application contemplates the provision of an addition control network, responsive to changes in load current at the output of the power supply, for deriving a control voltage; and this control voltage is, in accordance with the said structure of my prior copending application Serial No. 479,887, employed to vary the output repetition rate or output amplitude of an oscillator, thereby to modify slightly the grid potential in the aforementioned regulator tube.

It will be appreciated that this particular form of improved voltage regulator depends therefore upon varying the output of a driving oscillator; and in many applications, paticularly in television applications, the driving oscillator is required to have a fixed frequency and output. The present invention, recognizing this further situation, relates to an improved form of voltage regulator adapted to provide substantially perfect voltage regulation over a wide range of load current variation without requiring any change in either the frequency or magnitude of output of a driving oscillator associated with the regulator circuit.

It is accordingly an object of the present invention to provide an improved high direct voltage power supply that is self-regulating to compensate for load variations.

Another object of the present invention resides in the provision of a power supply employing a driving source of alternating current such as an oscillator, wherein regulation is effected by electronic means without requiring any change in either the repetition rate or output magnitude of said driving source.

A still further object of the present invention resides in the provision of a relatively inexpensive high voltage regulated power supply wherein the regulation obtained is as good or better than that presently obtainable with more expensive forms of regulator circuits.

Still another object of the present invention resides in the provision of a voltage regulated power supply wherein substantially perfect stable operation is obtainable over a predetermined and adjustable range.

Another object of the present invention resides in the provision of an improved voltage regulated power supply wherein load voltage control is effected through load current variations.

In providing for the foregoing objects and advantages, the present invention contemplates the provision of a voltage regulated power supply comprising a grid controlled regulator tube having a load coupled to the cathode thereof, and having a substantially unregulated D.C. supply coupled to the anode thereof, in the manner of my aforementioned prior Patent No. 2,679,550. The said source of unregulated anode supply may, as will be described, comprise a source of substantially steady alternating current which is amplified and rectified prior to application to the anode of the aforementioned regulator tube; and the said source of substantially steady alternating current may in fact comprise a sawtooth generator such as is conventionally found in known television receivers.

In order to provide for voltage regulation, the present invention further contemplates the provision of a further source of direct voltage, coupled to the control grid of the aforementioned regulator tube; and this further source of direct voltage may in turn comprise an amplifier, such as for example a grid-controlled vacuum tube, a transistor, a magnetic amplifier, etc., coupled to the output of another steady low power source of alternating current, and having the output thereof in turn coupled via rectifier means to the grid of the regulator tube. When such an arrangement is employed, therefore, the potential applied to the grid of my regulator tube depends upon the gain imposed by the aforementioned amplifier; and, as will be described, this gain may be controlled by a relatively small voltage derived from load current variations, thereby to maintain a constant voltage across the power supply load even with variations in such load current.

The foregoing objects, advantages, construction and operation of the present invention will become more readily apparent from the following description and accompanying drawings, in which:

Figure 1 is a block diagram of a voltage regulated power supply constructed in accordance with the present invention.

Figure 2 is a schematic diagram illustrating one form of power supply constructed in accordance with the block diagram of Figure 1.

Figure 3:
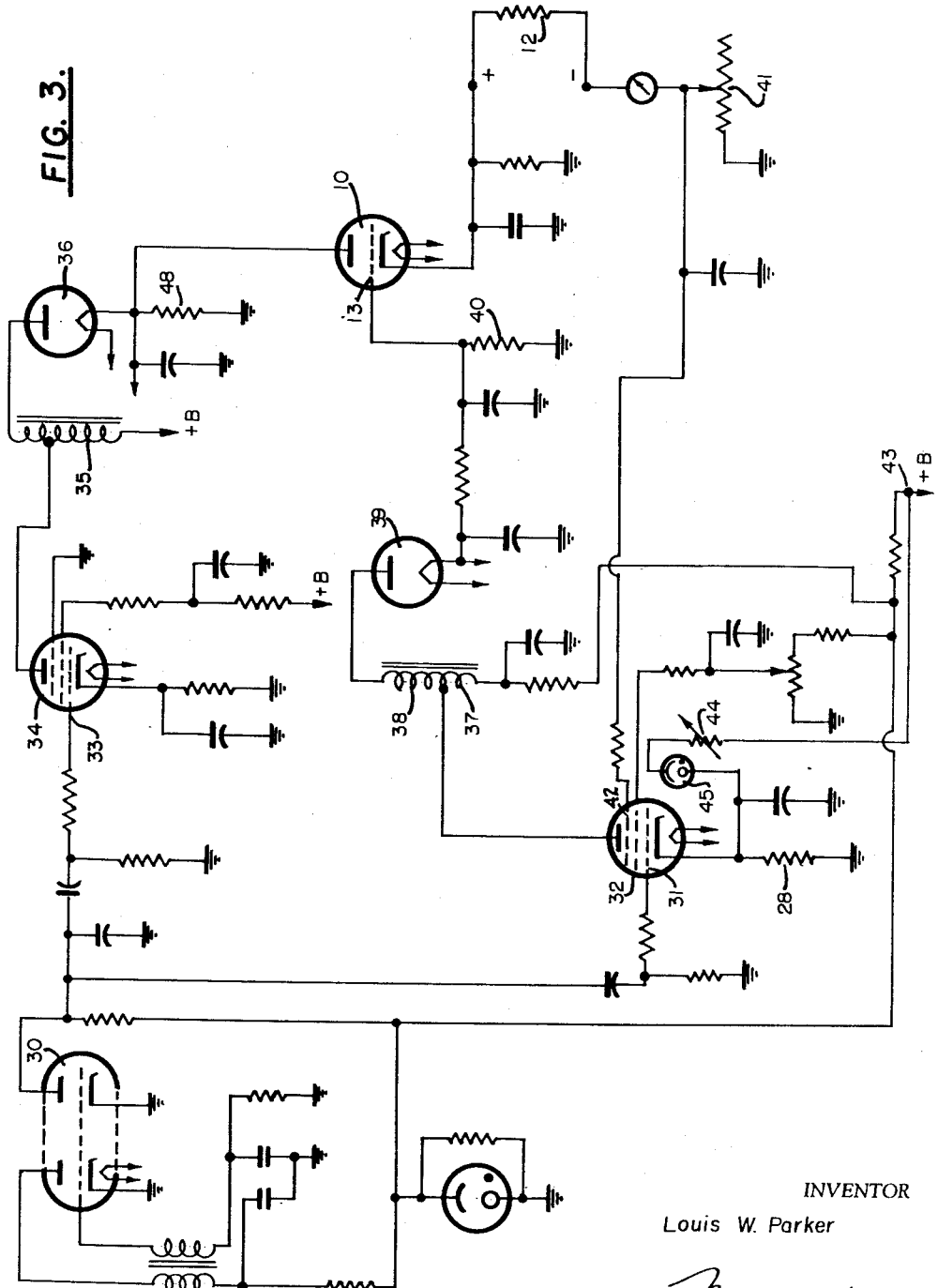
Figure 3 is a schematic diagram of another form of power supply constructed in accordance with the block diagram of Figure 1 and illustrating certain improvements which may be effected, if desired.

Referring now to Figure 1, it will be seen that, in accordance with the present invention, an improved voltage regulated power supply may comprise a regulator tube 10 depicted as a grid-controlled vacuum tube, and the anode of the said tube 10 may be coupled to a source 11 of unregulated D.C. A load 12 may be coupled to the cathode of the said tube 10. Source 11, as mentioned, is unregulated in nature, and has a variable voltage output; and the voltage variation thereof may in fact arise from two main causes. One of these is the internal resistance of various components in the power supply which are lumped together and represented as resistance $R_1$ in series with a D.C. generator E having no voltage variation when varying current is drawn from it. The other possible source of voltage variation at the output of source 11 arises from line voltage variation. Each of these possible factors may be compensated in accordance with various aspects of the present invention.

The voltage output of D.C. supply 11 is so chosen that, in addition to supplying the necessary voltage required by load 12, it is also capable of providing for voltage drops across the aforementioned internal resistance $R_1$ and across regulator tube 10 when the highest rated current is drawn by load 12 and the A.C. line voltage drops to its lowest permissible values. Obviously, when these extreme load and line conditions do not exist, the voltage output of source 11 is considerably higher than the minimum necessary value thereof; and this excess voltage is taken care of in such cases by an increased voltage drop across regulator tube 10. The voltage drop across regulator tube 10 is in turn controlled by a regulating voltage coupled to control grid 13 thereof; and the present invention is accordingly primarily concerned with supplying a proper value of regulating voltage to the said grid 13.

In particular, it will be noted that load current passing through load 12 is also caused to pass through a variable resistance 14 whereby such load current variations are changed into corresponding voltage variations across the said resistor 14. The value of resistor 14 is so chosen that a voltage drop in the order of two or three volts is produced thereacross, and this voltage variation is a comparatively insignificant part of the total voltage available at the cathode of regulator tube 10. This voltage across resistor 14 is in turn employed as a control voltage, and is coupled to an A.C. amplifier 15 which may comprise a vacuum tube, a transistor, a magnetic amplifier, or the like, and serves to vary the gain of the said amplifier 15. Amplifier 15 also receives a steady A.C. voltage from a source 16, whereby the output of source 16 is amplified to an extent determined in part by the gain of amplifier 15. An increase in gain of amplifier 15 thus increases the magnitude of output produced thereby; and this variable amplitude A.C. output from amplifier 15 is thereafter rectified to provide a controlled D.C. supply 17, which is in turn coupled to grid 13 of regulator tube 10 to control the potential drop across the said regulator tube 10.

Summarizing the foregoing, therefore, it will be noted that when the impedance of load 12 decreases, thereby increasing the magnitude of load current, this increases the control voltage appearing across resistor 14. This increased control voltage across resistor 14 is in turn employed to increase the gain of amplifier 15 and consequently, the A.C. output of the said amplifier 15; and this increased A.C. output is then rectified (e.g. in D.C. source 17) and in turn coupled to the grid 13 of regulator tube 10 to decrease its impedance to the aforementioned increased load current.

If the value of this decrease in regulator tube impedance is correctly chosen, the D.C. voltage across regulator tube 10 will drop by the same amount as the sum of the increased voltage drops across the internal impedance $R_1$ of the power supply, plus the small voltage drop across element 14. Inasmuch therefore as the control voltage change across resistor 14 is exactly in proportion to the change in voltage across impedance $R_1$, complete compensation of the load voltage is theoretically possible if the amplifier and regulator tubes 15 and 10 are operating on linear portions of their characteristics.

One circuit operating in the manner described in reference to Figure 1 is illustrated in greater detail in Figure 2. In particular, it will be noted that the aforementioned amplifier 15 may comprise a multi-grid vacuum tube such as a pentode. Source 16 may in turn comprise means producing a substantially sawtooth wave, and the said source 16 may be coupled to control grid 18 of tube 15. The anode of tube 15 is coupled to an inductive plate load 19 which includes a voltage step-up winding 20, whereby a high positive pulse will be produced at the anode 21 of a diode rectifier 22, upon occurrence of appropriate drive from the sawtooth source 16. Cathode 23 of diode 22 is coupled to a capacitor 24 serving to filter the aforementioned positive pulse; and this filtered and rectified D.C. potential is thereafter applied to control grid 13 of regulator tube 10. A resistor $R_2$ of very high resistance value is also coupled between control grid 13 and ground, and this particular resistor serves as both a grid leak and bleeder load.

An unregulated power supply 11 is, as has been described in reference to Figure 1, connected to the anode of regulator tube 10, and this power supply 11 is adapted to produce an output voltage in excess of voltage applied to the control grid 13 of regulator tube 10, the polarity of this unregulated D.C. voltage being such as to make the anode of tube 10 positive with respect to ground. Load 12 is, as shown, connected at one of its ends to the cathode of regulator tube 10; and in order to complete the load current circuit, variable resistor 14 is connected between the lower end of load 12 and ground. The junction of resistors 12 and 14 is also connected via line 25 to a further control electrode 26 in amplifier 15; and for the particular arrangement illustrated in Figure 2, this further electrode 26 may comprise, for instance, the suppressor grid of the said tube 15, although controlling the first grid bias would also serve the purpose.

The operation of the circuit shown in Figure 2 is as follows. Unregulated power supply 11 supplies a positive direct current potential to the anode of regulator tube 10, which potential is of higher magnitude than the desired output load voltage across load 12. Grid 13 of regulator tube 10 is also supplied with a direct current potential, having a magnitude approximately equal to the desired output load voltage; and the generation of this particular grid potential has already been explained. Regulator tube 10 functions as a cathode follower and maintains an output load voltage which is fairly well regulated as the load current is varied, provided grid 13 is maintained at a fixed potential. In order to improve the load voltage regulation to the point where it remains absolutely steady within a predetermined range of load current, it is necessary to increase the potential applied to grid 13 of regulator tube 10 as the load current is increased, thereby to compensate for the load voltage decrease which would normally attend such increased load currents.

An increase in load current, of course, serves to increase the voltage drop across variable resistor 14 with the polarity being positive above ground at the junction of resistor 14 and load 12. The increased positive potential at this junction is accordingly coupled via line 25 to control electrode 26 of amplifier 15, and serves to increase the plate current through the said amplifier 15 thereby resulting in a larger peak positive pulse at the anode of rectifier 22. This increased positive potential at the anode of rectifier 22 in turn effects an increased positive potential at the control grid 13 of regulator tube 10, whereby the internal voltage drop across regulator tube 10 is decreased thereby to maintain a fixed steady potential at the cathode of the said tube 10 and at load 12.

A decrease in load current will, in a manner analogous to that already described above, result in a decrease of positive potential at the control grid 13 of tube 10 thereby to increase the internal voltage drop of tube 10, and again maintaining a fixed steady output potential across load 12.

In the particular arrangement of Figure 2, control electrode 26 of amplifier 15 is illustrated as positive with respect to ground; but it will be appreciated that the said control electrode 26 is in fact negative with respect to cathode 27 of tube 15, due to the inclusion of cathode bias resistor 28 and bleeder resistor 28a. The control voltage range necessary to effect substantially perfect load regulation for an arrangement of the type illustrated in Figure 2, is in the order of two volts on suppressor grid 26. It will be appreciated, of course, that although source 16 has been shown as coupled to the control grid 18 of tube 15, while the control voltage appearing across resistor 14 has been connected to the suppressor grid 26 of the said tube 15, these voltages may in fact be applied to any one or more of the other electrodes in the said tube 15.

The arrangements of Figures 1 and 2 are primarily adapted to compensate for variations in the output of unregulated D.C. supply 11, due to variations in the voltage drop across its internal impedance $R_1$; and it will be appreciated further that the specific circuit of Figure 2 is illustrative of only one form that my improved voltage regulated power supply may take. Reference is now made to the circuit of Figure 3 which shows possible modifications in the circuit of Figure 2, and which includes in addition means for compensating for variations in line voltage. In particular, the source 16 described in reference to Figures 1 and 2, may, if desired, comprise a sawtooth generator taking the form of a double triode 30; and this circuit, with the components associated therewith, acts to generate and shape a sawtooth type wave which may be supplied to the control grid 31 of a pentode 32 as well as to the control grid 33 of a further pentode 34.

Pentode 34 comprises one portion of the unregulated D.C. supply 11, illustrated in Figures 1 and 2; and in particular, the anode of the said pentode 34 may be coupled to an inductive load 35 having a step-up winding portion similar to the load 19—20 already described in reference to Figure 2, whereby positive voltage pulses are impressed upon the anode of a rectifier 36 in response to drive from sawtooth generator 30. The rectified output so appearing at the cathode of rectifier 36 is, as before, coupled to the anode of regulator tube 10 and serves as the source of supply for load 12 coupled to the cathode of the said tube 10.

In a similar manner, the anode of pentode 32 is coupled to a further inductive plate load 37—38; and the positive output pulses produced thereacross are rectified in rectifier 39, and are applied to grid 13 of the said regulator tube 10. Since no power is taken from the power supply comprising elements 30, 32, 37, 38 and 39, other than the fixed load of bleeder resistor 40, the voltage applied to grid 13 remains constant except as it is deliberately changed by feedback control developed across adjustable resistor 41; and this adjustable voltage across resistor 41 is in turn determined by variations in load current flowing through the said resistor 41 via load 12.

In order to reduce the great increase of potential on the anode of regulator 10 when load 12 is of high resistance or is removed altogether, I have found it very helpful to use a varistor such as a thyrite element, across the high voltage output of rectifier 36. This varistor 48 draws a comparatively heavy current when the voltage becomes excessive, but it does not affect operation on normal voltages.

The operation of the circuit thus provided in Figure 3 is generally the same as that already described in reference to Figures 1 and 2, in that the variable voltage appearing across resistor 41 acts to control the potential on suppressor grid 42 of pentode 32 and thereby in turn ultimately controls the potential appearing on control grid 13 of regulator tube 10.

As was mentioned previously, there are two main causes for voltage variation across a load such as 12; and one of these factors comprises possible variation in internal resistance of the power supply. This particular factor can be completely balanced out by systems of the types already described in reference to Figures 1 through 3. The other possible reason for voltage variation across load 12 comprises possible A.C. line voltage changes. This may be represented in the arrangement of Figure 1 by a possible variation of output voltage at generator E, and the methods already described in reference to Figures 1 through 3 do not materially lessen load voltage variations due to such variations in generator voltage. While it is possible to use gas regulator tubes to keep some of the more critical voltages constant, for instance the D.C. supply voltages coupled to the various amplifier and oscillator stages, these methods involve the use of a plurality of regulating tubes, and are attended by high power loss, excessive heat dissipation and increased cost.

In accordance with the present invention, however, such possible line voltage variations (which may appear, for instance, as variations in the B+ supplies shown in Figures 2 and 3), may be balanced out quite simply and without appreciably increasing the complexity of the circuit. In particular, it will be noted that since amplifier 32 provides the ultimate control of D.C. voltage on grid 13 of regulator tube 10, further control of this D.C. grid voltage may be accomplished by causing the gain of the said amplifier tube 32 to depend not only upon variations in load current but to depend also upon possible variations in line voltage.

In particular, another control line may be coupled to one of the electrodes in amplifier 32, for instance from B+ supply 43 to the cathode of pentode 32, via a variable resistance 44, and regulator tube 45. Consequently, when the B+ supply tends to increase in a positive direction, the cathode potential of tube 32 assumes a similar positive increment and this has the same effect on the suppressor grid 42 as applying a more negative potential to the said suppressor grid, whereby the amplification or gain of tube 32 is decreased and a lower control voltage is ultimately impressed upon grid 13 of regulator tube 10. A converse situation, of course, occurs if the B+ supply 43 should decrease in potential.

It is necessary, of course, to adjust this auxiliary control potential, supplied in response to variations in the B+ source, to cause the gain of tube 32 to exactly compensate for the change in B+; and this adjustment in compensating potential is accomplished by the aforementioned variable resistor 44 and regulator tube 45 whereby some of the B+ potential is dropped across each of elements 44 and 45 with the two voltage drops being so proportioned that only the necessary voltage variation appears at the cathode of tube 32.

While I have thus described preferred embodiments of the present invention, many variations will be suggested to those skilled in the art; and the foregoing description is, therefore, meant to be illustrative only and should not be considered limitative of my invention. All such variations as are in accord with the principles described are meant to fall within the scope of the appended claims.

Having thus described my invention, I claim:

1. In a constant voltage power supply, a space discharge device including an anode, a cathode, and a grid, load means coupled to the cathode of said discharge device, a first source of D.C. voltage coupled to the anode of said discharge device, a source of recurrent voltage waves, an alternating current variable gain amplifier coupled to said source for amplifying said waves, rectifier means coupled to the said amplifier for effecting a second source of D.C. voltage substantially independent of said first source of D.C. voltage, means coupling said second source of D.C. voltage to the grid of said discharge device, feedback means responsive to changes in current through said load means for varying the gain of said amplifier, said feedback means comprising an impedance connected in series with said load means whereby the voltage developed across said impedance varies with variations in current through said load means, and means coupling the voltage developed across said series impedance to said amplifier for varying the gain of said amplifier whereby changes in current through said load means cause corresponding changes in the voltage magnitude of said second source of D.C. voltage thereby to maintain a constant voltage across said load means.

2. The power supply of claim 1 wherein said first source of D.C. voltage comprises a further amplifier coupled to said source of recurrent voltage waves, and further rectifier means interposed between said further amplifier and the anode of said discharge device.

3. The power supply of claim 1 wherein said amplifier includes a multi-grid vacuum tube, the voltage developed across said series impedance being coupled to a selected grid of said vacuum tube for varying the potential at said selected grid thereby to change the gain of said amplifier, said source of recurrent voltage waves being coupled to another grid of said vacuum tube.

4. The power supply of claim 1 including a source of supply voltage for energizing said amplifier, and means responsive to variations in said supply voltage for also varying the gain of said amplifier.

5. The power supply of claim 1 wherein said source of recurrent voltage waves includes a sawtooth generator.

6. A power supply adapted to supply a substantially constant potential to a load, comprising a source of alternating current of higher peak potential than that to be applied to the said load, said source of alternating current including an oscillator originating said alternating current, a rectifier for rectifying the output of said source, an electron discharge device having an anode, a cathode and a grid, means connecting said anode to the positive side of said rectified output, means connecting said load to said cathode, a source of direct current potential comprising an alternating current variable gain amplifier coupled to said oscillator and a further rectifier coupled to the output of said amplifier, said direct current source being separate from said rectified output and having a steady potential of substantially the same value as the operating potential of said load, means coupling the positive side of said direct current potential source to said grid, control means connected to said load and responsive to variations in current through said load for producing a control voltage which varies with variations in said load current, said control voltage being appreciably smaller than the operating potential of said load, and means coupling said small control voltage to said amplifier for varying the gain of said amplifier to vary the output magnitude of said source of direct current potential thereby to maintain said substantially constant potential at said load.

7. The combination of claim 6 including a source of supply potential for energizing said amplifier, and further control means responsive to variations in magnitude of said supply potential for also varying the gain of said amplifier.

8. A constant voltage power supply comprising a source of substantially steady alternating current, first rectifier means coupled to said source for obtaining a first direct current potential, a discharge device comprising an anode, a cathode and a grid, means coupling the output of said first rectifier means to said anode, load means connected to the cathode of said discharge device whereby said discharge device operates as a cathode follower, means including an alternating current variable gain amplifier and second rectifier means coupled to said source of alternating current for obtaining a second substantially steady direct current potential substantially independent of said first direct current potential, means coupling said second direct current potential to the grid of said discharge device, and control means responsive to variations in current through said load for varying the gain of said amplifier thereby to vary the magnitude of said second direct current potential, said control means comprising a resistance in series with said load for carrying the current which passes through said load whereby the voltage across said resistance varies with variations in said load current, and means coupling said resistance to said amplifier whereby the voltage across said resistance controls the gain of said amplifier.

9. The power supply of claim 8 wherein said source of alternating current comprises a sawtooth generator.

10. A constant voltage power supply comprising a load, a first amplifier for supplying power to said load, variable impedance means coupling said first amplifier to said load whereby the voltage across said load is dependent upon the magnitude of said variable impedance means, a second variable gain amplifier for controlling the magnitude of said variable impedance means thereby to control the voltage across said load, means for deriving a control signal dependent upon the magnitude of current in said load, said control signal varying with variations in said load current, and means coupling said varying control signal to said second amplifier for varying the gain of said second amplifier to vary the magnitude of said variable impedance means with variations in current through said load thereby to hold the potential across said load at a predetermined substantially constant magnitude.

11. The combination of claim 10 wherein said variable impedance means comprises a grid controlled vacuum tube, the output of said first amplifier being coupled to the anode of said vacuum tube, said load being coupled to the cathode of said vacuum tube, the output of said second amplifier being coupled to the control grid of said vacuum tube.

12. The power supply of claim 4 wherein said means responsive to variations in said supply voltage includes a gas regulator tube which exhibits a substantially constant voltage drop.

13. The power supply of claim 8 wherein said resistance in series with said load means is appreciably smaller in size than the size of said load whereby the voltage across said resistance has a magnitude which is a small fraction of the voltage across said load.

References Cited in the file of this patent

UNITED STATES PATENTS

| | | |
|---|---|---|
| 2,443,534 | Eglin | June 15, 1948 |
| 2,551,407 | Alder | May 1, 1951 |
| 2,556,129 | Wellons | June 5, 1951 |
| 2,683,852 | Sampson | July 13, 1954 |
| 2,829,334 | Murnighan | Apr. 1, 1958 |